(12) United States Patent
Aist et al.

(10) Patent No.: US 9,097,548 B2
(45) Date of Patent: Aug. 4, 2015

(54) CONTENT DELIVERY SYSTEM WITH NATURAL LANGUAGE MECHANISM AND METHOD OF OPERATION THEREOF

(71) Applicant: Telenav, Inc., Sunnyvale, CA (US)

(72) Inventors: Gregory Stewart Aist, San Mateo, CA (US); Aliasgar Mumtaz Husain, Milpitas, CA (US); Jose Sebastian, Sunnyvale, CA (US)

(73) Assignee: TELEVAV, INC., Sunnyvale, CA (US)

( * ) Notice: Subject to any disclaimer, the term of this patent is extended or adjusted under 35 U.S.C. 154(b) by 46 days.

(21) Appl. No.: 13/894,174

(22) Filed: May 14, 2013

(65) Prior Publication Data

US 2014/0195155 A1    Jul. 10, 2014

Related U.S. Application Data

(60) Provisional application No. 61/749,544, filed on Jan. 7, 2013.

(51) Int. Cl.
*G01C 21/34* (2006.01)
*G01C 21/36* (2006.01)

(52) U.S. Cl.
CPC ........ *G01C 21/3484* (2013.01); *G01C 21/3641* (2013.01)

(58) Field of Classification Search
CPC ........... G01C 21/3617; G01C 21/3484; G01C 21/3608; G10L 15/18; G10L 25/00; G10L 15/22
USPC .......... 701/36, 113, 425, 431, 455, 533, 541, 701/532; 704/257, 275, 231, 251, 258, 254
See application file for complete search history.

(56) References Cited

U.S. PATENT DOCUMENTS

| | | | |
|---|---|---|---|
| 6,598,018 B1 * | 7/2003 | Junqua ........................ | 704/251 |
| 8,239,129 B2 | 8/2012 | Shen et al. | |
| 2004/0230345 A1 * | 11/2004 | Tzamaloukas .................... | 701/1 |
| 2004/0230370 A1 * | 11/2004 | Tzamaloukas ............... | 701/200 |
| 2005/0131699 A1 * | 6/2005 | Fukada ........................ | 704/270 |
| 2006/0015249 A1 * | 1/2006 | Gieseke ....................... | 701/210 |
| 2006/0025923 A1 * | 2/2006 | Dotan et al. .................. | 701/207 |
| 2006/0173841 A1 * | 8/2006 | Bill ................................ | 707/6 |
| 2007/0021905 A1 * | 1/2007 | Takashima et al. ........... | 701/201 |
| 2007/0106468 A1 * | 5/2007 | Eichenbaum et al. ........ | 701/211 |
| 2008/0162033 A1 * | 7/2008 | Wagner et al. ............... | 701/201 |
| 2008/0262714 A1 * | 10/2008 | Abramovich Ettinger ... | 701/201 |
| 2009/0150156 A1 | 6/2009 | Kennewick et al. | |
| 2009/0271104 A1 * | 10/2009 | Letchner et al. ............. | 701/200 |
| 2010/0036599 A1 * | 2/2010 | Froeberg et al. ............. | 701/200 |
| 2010/0057346 A1 * | 3/2010 | Ehrlacher .................... | 701/202 |
| 2010/0205060 A1 * | 8/2010 | Athsani et al. ............. | 705/14.58 |
| 2010/0217604 A1 * | 8/2010 | Baldwin et al. .............. | 704/275 |
| 2011/0153191 A1 * | 6/2011 | Dhanani ..................... | 701/201 |
| 2011/0313649 A1 * | 12/2011 | Bales et al. .................. | 701/200 |
| 2012/0158289 A1 * | 6/2012 | Bernheim Brush et al. .. | 701/425 |
| 2013/0038635 A1 * | 2/2013 | Bales et al. .................. | 345/660 |

(Continued)

*Primary Examiner* — John R Olszewski
*Assistant Examiner* — Truc M Do
(74) *Attorney, Agent, or Firm* — IP Investment Law Group

(57) ABSTRACT

A method of operation of a content delivery system includes: determining a context for identifying a device within a geographic region; identifying a feature of a candidate route; generating a route description based on the feature with a control unit; and generating a prompt based on the context for adding, removing, or a combination thereof the feature from the route description for delivering on the device.

22 Claims, 6 Drawing Sheets

(56) References Cited

U.S. PATENT DOCUMENTS

| | | | |
|---|---|---|---|
| 2013/0054228 A1* | 2/2013 | Baldwin et al. | 704/9 |
| 2013/0073143 A1* | 3/2013 | Miura et al. | 701/36 |
| 2013/0197890 A1* | 8/2013 | Ide et al. | 703/6 |
| 2013/0253834 A1* | 9/2013 | Slusar, Mark | 701/540 |
| 2013/0304473 A1* | 11/2013 | Baldwin et al. | 704/257 |
| 2014/0012495 A1* | 1/2014 | Ide et al. | 701/424 |

* cited by examiner

CONTENT DELIVERY SYSTEM WITH NATURAL LANGUAGE MECHANISM AND METHOD OF OPERATION THEREOF

CROSS-REFERENCE TO RELATED APPLICATION(S)

This application claims the benefit of U.S. Provisional Patent Application Ser. No. 61/749,544 filed Jan. 7, 2013, and the subject matter thereof is incorporated herein by reference thereto.

TECHNICAL FIELD

The present invention relates generally to a content delivery system, and more particularly to a system with natural language mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Content delivery systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a content delivery system without natural language mechanism has become a paramount concern for the consumer. The inability decreases the benefit of using the tool.

Thus, a need still remains for a content delivery system with natural language mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a content delivery system including: determining a context for identifying a device within a geographic region; identifying a feature of a candidate route; generating a route description based on the feature with a control unit; and generating a prompt based on the context for adding, removing, or a combination thereof the feature from the route description for delivering on the device.

The present invention provides a content delivery system, including: a context module for determining a context for identifying a device within a geographic region; a feature extraction module, coupled to the context module, for identifying a feature of a candidate route; a predictive module, coupled to the feature extraction module, for generating a route description based on the feature with a control unit; and a prompt module, coupled to the predictive module, for generating a prompt based on the context for adding, removing, or a combination thereof the feature from the route description for delivering on the device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
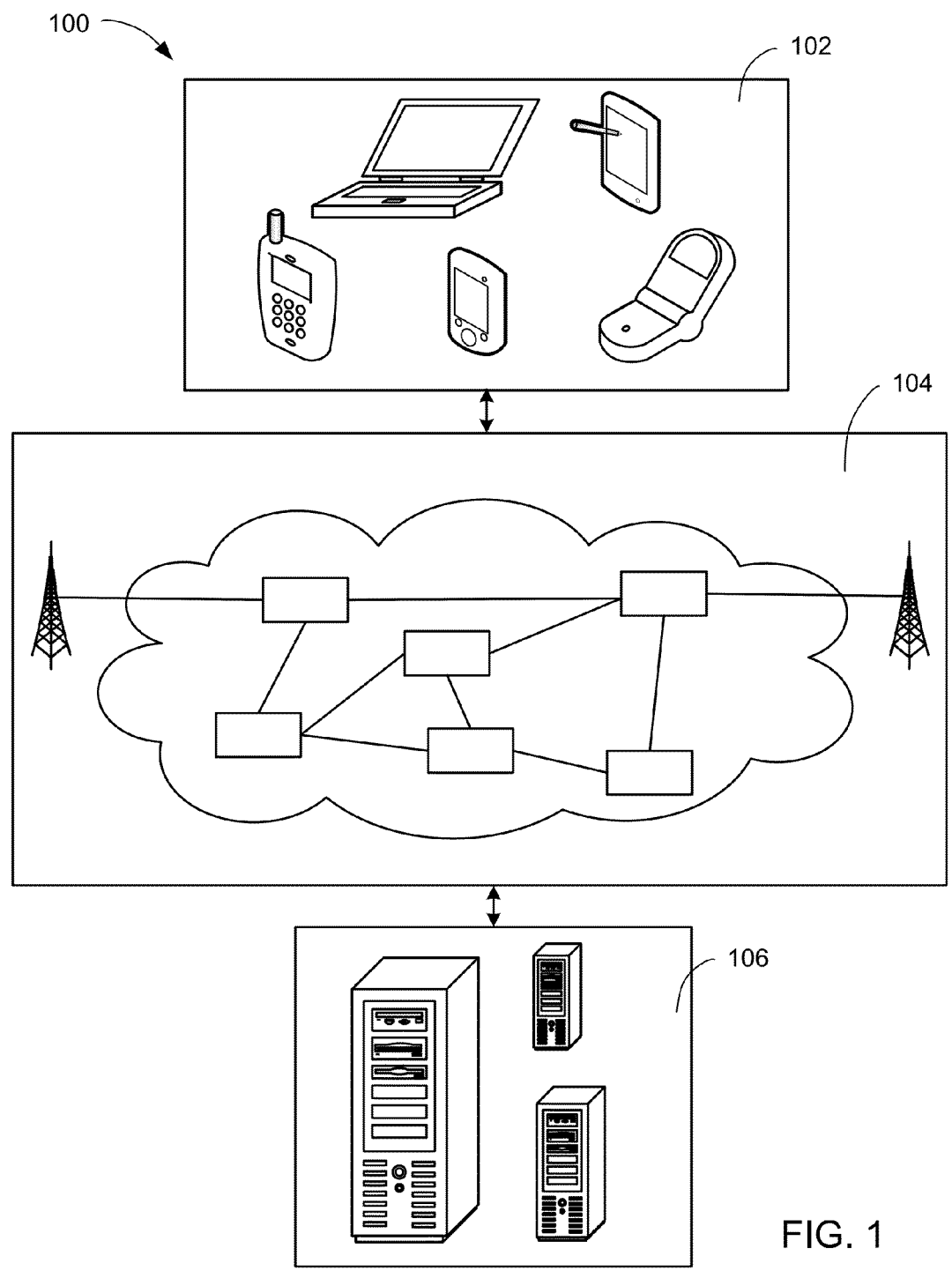
FIG. 1 is a content delivery system with natural language mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the content delivery system 100 are semi-diagrammatic and not to scale and, particularly, some of the dimensions are for the clarity of presentation and are shown exaggerated in the drawing FIGs.

Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content delivery system 100 with natural language mechanism in an embodiment of the present invention. The content delivery system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the content delivery system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the content delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the content delivery system 100 is shown with the second device 106 and the first device 102 as end points of the communication path 104, although it is understood that the content delivery system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
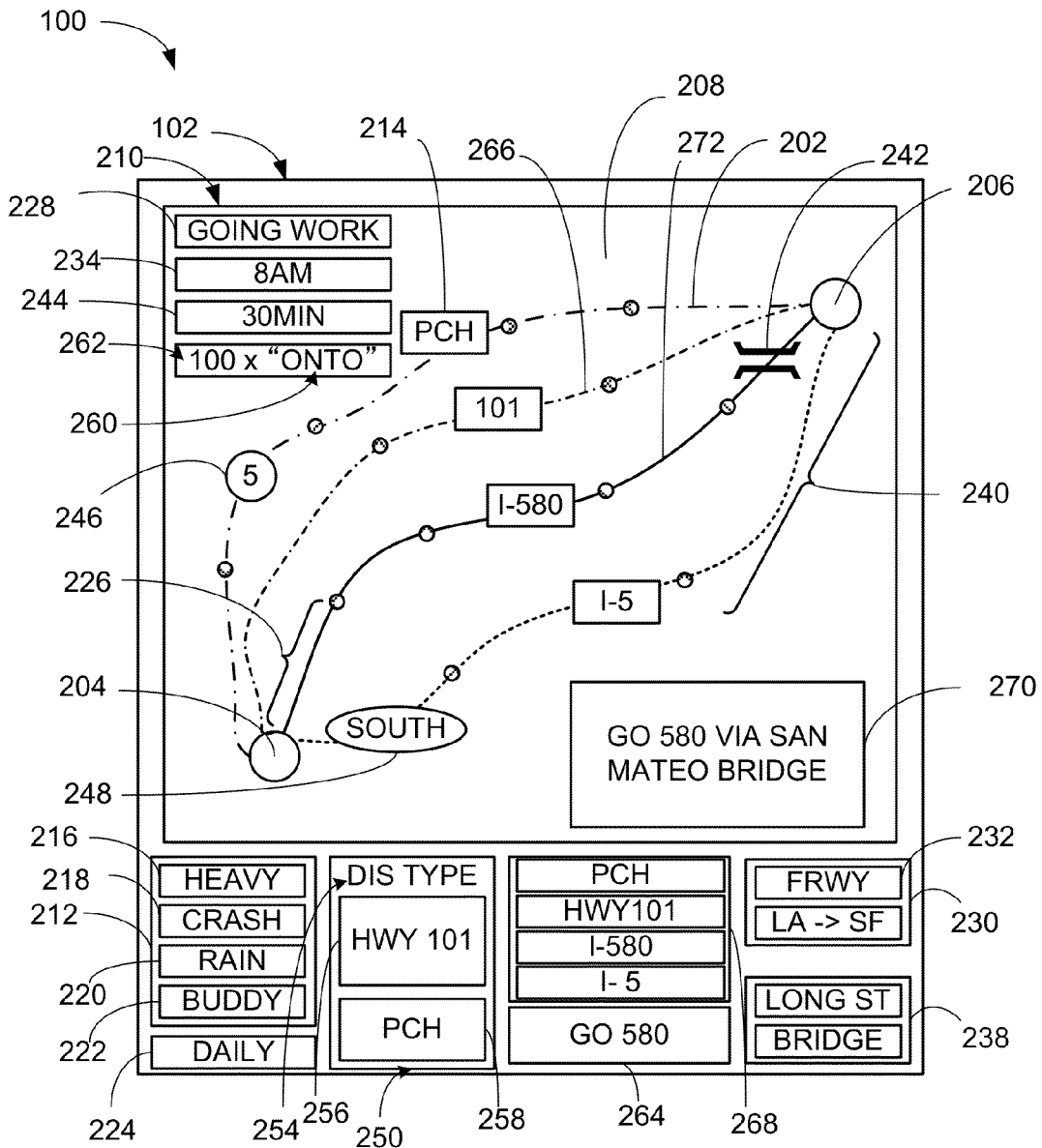
FIG. 2 is an example of a candidate route from a start location to a destination within a geographic region displayed on a display interface of the first device.

Referring now to FIG. 2, there is shown an example of a candidate route 202 from a start location 204 to a destination 206 within a geographic region 208 displayed on a display interface 210 of the first device 102. For clarity and brevity, the discussion of the embodiment of the present invention will focus on the first device 102 delivering the result generated by the content delivery system 100. However, the second device 106 of FIG. 1 and the first device 102 can be discussed interchangeably.

The candidate route 202 is defined as a possible travel path for traversing from the start location 204 to the destination 206. The start location 204 can represent the beginning geographic location, area, or a combination thereof of the travel. The destination 206 can represent the ending geographic location, area, or a combination thereof of the travel. The geographic region 208 can represent a neighborhood, city, county, state, country, or a combination thereof.

Route information 212 can represent a fact or facts pertaining to the candidate route 202. For example, the route information 212 can include a road name 214, a traffic condition 216, incident information 218, weather information 220, social information 222, or a combination thereof. The road name 214 can represent the name of the candidate route 202. The traffic condition 216 can represent the information related to the traffic flow on the candidate route 202. The incident information 218 can represent the accident, construction, or a combination thereof occurring on the candidate route 202. The weather information 220 can represent the weather activity on the candidate route 202. The social information 222 can represent a travel history 224 of the candidate route 202 by the user of the first device 102, the user's friend with a social network relationship, other users, or a combination thereof. The social network relationship can represent a connection established via social networking site, such as Facebook™, LinkedIn™, Google+™, or a combination thereof. The travel history 224 is defined as an activity record for traveling within the geographic region 208. The travel history 224 can reveal whether the user is a local or a foreigner within the geographic region 208 based on how many times had the user traveled to the geographic region 208.

The candidate route 202 can include a road segment 226, which is defined as a section of the candidate route 202. For example, an aggregation of a plurality of the road segment 226 can construct the candidate route 202. For a specific example, the road segment 226 can connect between the geographic location A and geographic location B. Another instance of the road segment 226 can connect between the geographic location B and the geographic location C. By aggregating the two instances of the road segment 226, the candidate route 202 can be generated to connect the geographic location A and the geographic location C.

A context 228 is defined as a set of facts or circumstances that surround the first device 102. For example, the context 228 can include an environmental condition 230. The environmental condition 230 can include the start location 204, the destination 206, the geographic region 208, a route type 232 where the user is traveling, a travel time 234, the season of the year, the traffic condition 216, or a combination thereof.

The route type 232 is defined as a categorization of the candidate route 202. For example, the route type 232 can include a local road, an arterial road, an interstate highway, a state highway, or an expressway. The travel time 234 can represent a time of the day when the user of the first device 102 is traveling in the geographic region 208.

A feature 236 is defined as a characteristic of the candidate route 202. A feature type 238 is defined as a categorization of the feature 236. The feature type 238 can include a key feature 240 and a contrastive feature 242.

The key feature 240 is defined as a characteristic of the candidate route 202 without comparing to other instances of the candidate route 202. For example, the key feature 240 for the candidate route 202 can represent the road segment 226 having the longest distance, the longest time for a traversal duration 244, or a combination thereof in comparison to other instance of road segment 226 within the same instance of the candidate route 202. The traversal duration 244 can represent the time required to travel the road segment 226, the candidate route 202, or a combination thereof.

The key feature 240 can also represent the road segment 226 with highest total for a travel count 246 by all users, by amongst the user's friend with the social network relationship with the user of the first device 102, the user of the first device 102, or a combination thereof. The travel count 246 can represent the number of times traveled on the road segment 226 by the user, the user's friend, other user, or a combination thereof according to the travel history 224. The key feature 240 can also represent the route type 232. For example, the key feature 240 of the candidate route 202 can represent Interstate Highway 5.

The contrastive feature 242 is defined as a unique characteristic of the candidate route 202 in comparison to other instances of the candidate route 202. For example, the contrastive feature 242 can represent the instance of the road segment 226 only existing in one particular instance of the candidate route 202. The road segment 226 can represent a bridge, tunnel, or a combination thereof. For another example, the contrastive feature 242 can represent the candidate route 202 traveling through the geographic region 208 not traveled by other instances of the candidate route 202. For a different example, the contrastive feature 242 can represent the candidate route 202 having a directional label 248 unique from other instances of the candidate route 202. The directional label 248 is defined as a relative location of the candidate route 202 in comparison to other instances of the candidate route 202 within the geographic region 208. For example, the directional label 248 can represent "the southernmost route" in the geographic region 208.

A route description 250 is defined as the information for describing the road segment 226, the candidate route 202, a travel route 252, or a combination thereof. A description type 254 is defined as a categorization of the route description 250. The description type 254 can include a core description 256, an expansion 258, or a combination thereof.

The core description 256 is defined as the route description 250 having fundamental information. The fundamental information can represent the road name 214 of the candidate route 202, the road name 214 officially named by the government, or a combination thereof. The expansion 258 is defined as an alternative phrasing for describing the road segment 226, the candidate route 202, the travel route 252, or a combination thereof. The alternative phrasing can represent the name of the candidate route 202 commonly used vernacularly or colloquially. The vernacular or the colloquial can represent the expression or naming used by the local to the geographic region 208. The travel route 252 is defined as the candidate route 202 selected by the content delivery system 100 for traveling from the start location 204 to the destination 206.

An expression format 260 can represent the grammatical rule, the commonly used vernacularly, or a combination thereof for constructing a sentence. For example, the expression format 260 can represent the usage of proposition. More specifically, the expression format 260 can represent "turning onto street A" versus "turning to street A."

A total usage count 262 is defined as an aggregation for the number of usage of the expression format 260. For example, the total usage count 262 can tally the commonly used vernacular entered in a command input 264 by the user of the first device 102, the user's friend, other users, or a combination thereof. The command input 264 can represent manual entry, voice entry, or a combination thereof to the first device 102.

The candidate route 202 can be designated as a primary route 266 or a non-primary route 272 for presenting a route option 268. The primary route 266 can represent the candidate route 202 favored by the user of the first device 102, the other users, or a combination thereof. The primary route 266 can also represent the path currently traveled by the user of the first device 102. The candidate route 202 can be favored over other instances of the candidate route 202 based on the travel history 224 of most frequently or most commonly used. The candidate route 202 designated as the non-primary route 272 can be represented the secondary route, the tertiary route, and so on and so forth. Further, the non-primary route 272 can be represented as the alternative route to the primary route 266.

A prompt 270 is defined as the route description 250 presented on the first device 102. For example, the prompt 270 can represent a summary of the travel route 252. For another example, the prompt 270 can represent the core description 256 of the route option 268 for selecting out of the plurality of the candidate route 202.

FIG. 2 can illustrate the route option 268 with a plurality of the candidate route 202 for reaching the destination 206 from the start location 204. For example, the candidate route 202 can be from Berkeley, Calif. to Redwood City, Calif. The candidate route 202 can include the route option 268 of taking a plurality of the road segment 226 including Interstate Highway 580 via the Bay Bridge to United States (US) Highway 101 South. Another instance of the candidate route 202 can include the route option 268 of taking Interstate Highway 580 via the San Mateo-Hayward Bridge to US Highway 101 South. Another instance of the candidate route 202 can include the route option 268 of taking Interstate Highway 580 via the Dumbarton Bridge to US Highway 101 North.

Figure 3:
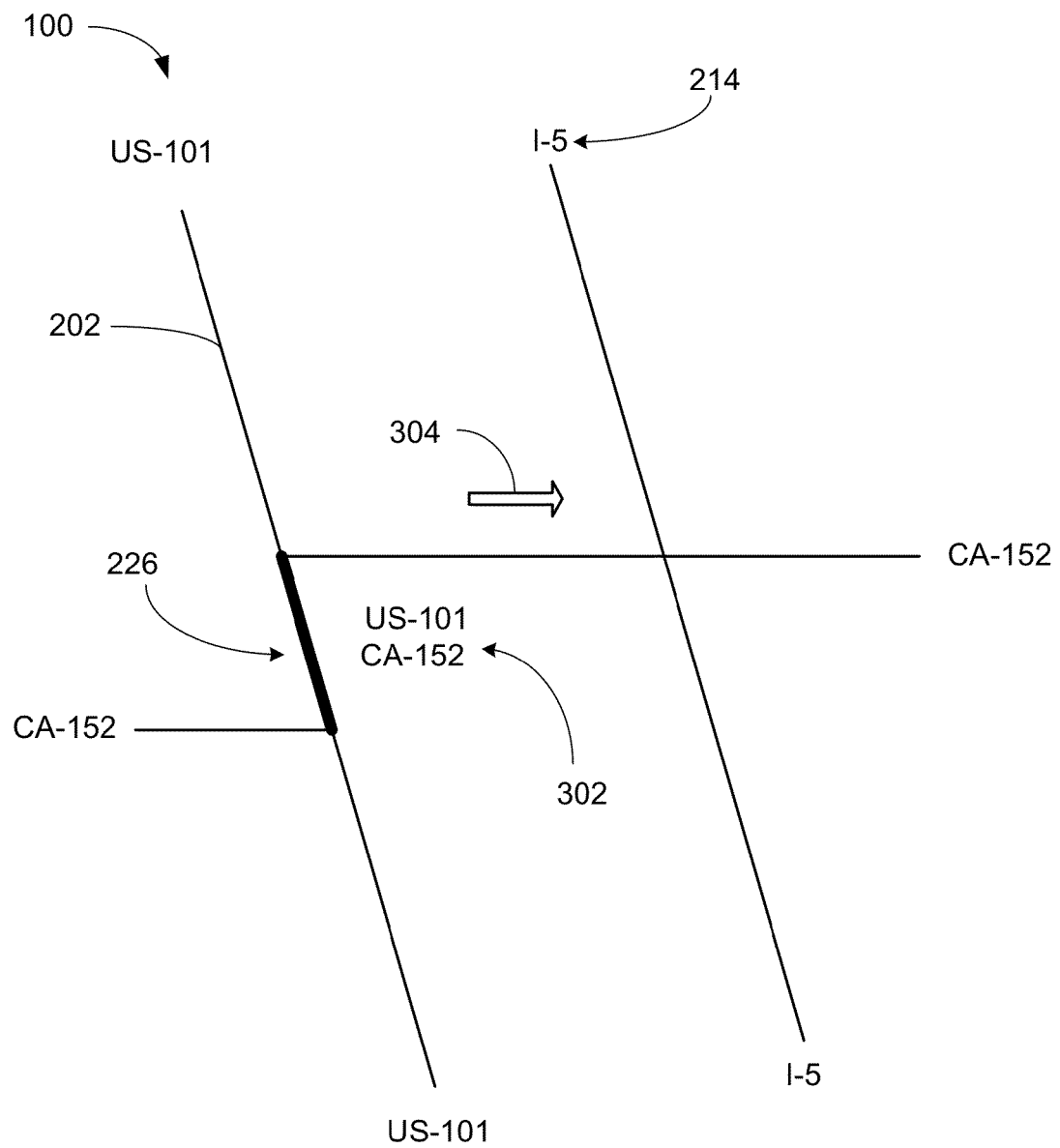
FIG. 3 is an example of a double naming of the candidate route.

Referring now to FIG. 3, there is shown an example of a double naming 302 of the candidate route 202. The double naming 302 is defined as the candidate route 202 having a plurality of the road name 214. For example, the road segment 226 shared by two instances of the candidate route 202 can have two names. More specifically, the road segment 226 can be named as "CA State Highway 152" and "US Highway 101." The content delivery system 100 can determine which name to select based on the context 228 of FIG. 2 of a user's travel direction 304. The context 228 can include the physical distance of the road segment 226

The user's travel direction 304 is defined as tendency of where the first device 102 of FIG. 1 is heading. For example, the user's travel direction 304 can represent the user traveling from San Francisco, Calif. to Salinas Calif. on US Highway 101. For a different example, the user's travel direction 304 can represent the user traveling from Los Banos, Calif. to Gilroy, Calif. on CA State Route 152. Details regarding resolving the double naming 302 will be discussed below.

Figure 4:
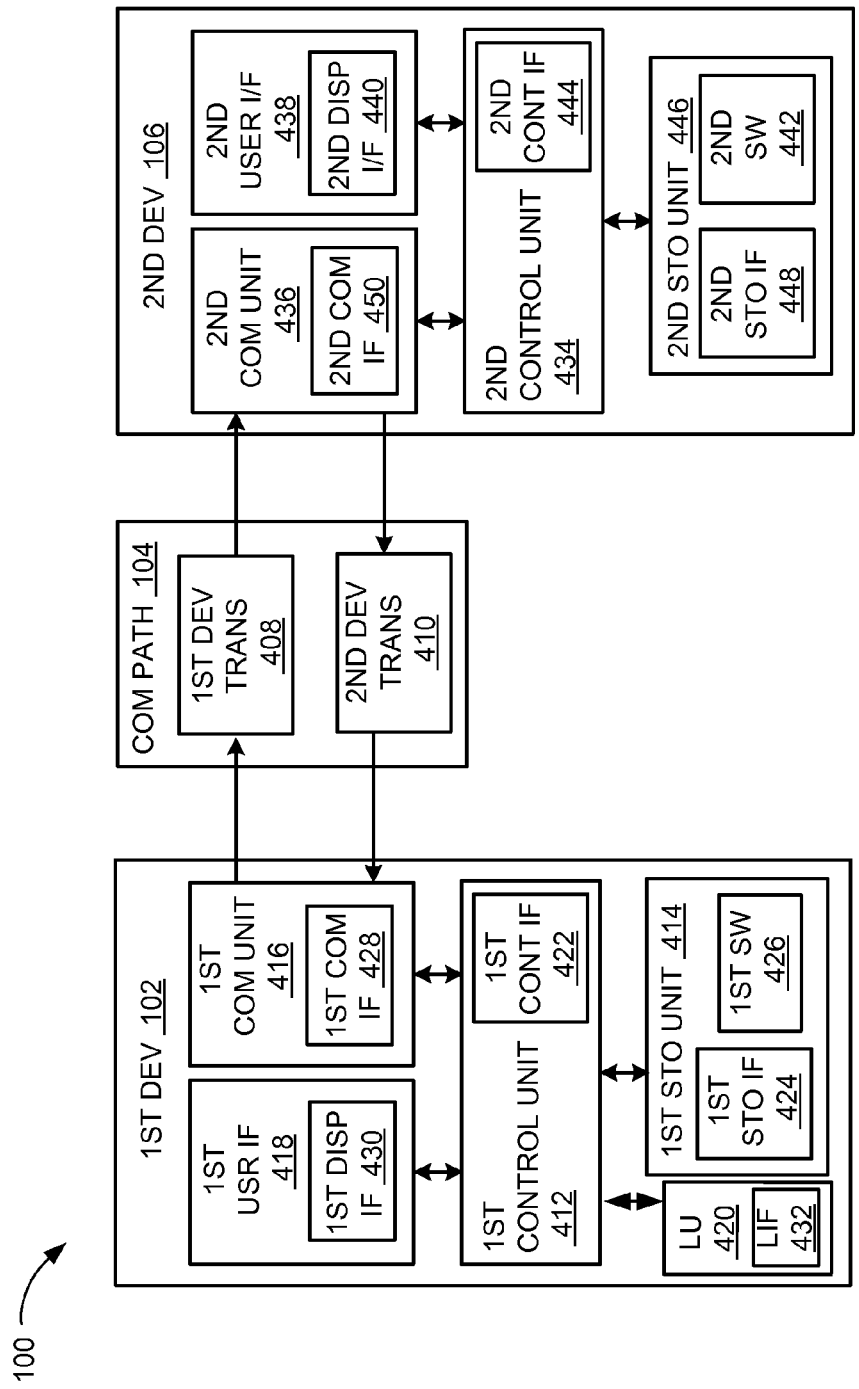
FIG. 4 is an exemplary block diagram of the content delivery system.

Referring now to FIG. 4, therein is shown an exemplary block diagram of the content delivery system 100. The content delivery system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the content delivery system 100 is shown with the first device 102 as a client device, although it is understood that the content delivery system 100 can have the first device 102 as a different type of device. For example, the first device 102 can be a server.

Also for illustrative purposes, the content delivery system 100 is shown with the second device 106 as a server, although it is understood that the content delivery system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the content delivery system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the content delivery system 100. The first control unit 412 can also execute the first software 426 for the other functions of the content delivery system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the content delivery system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the content delivery system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the content delivery system 100 is shown with the second storage unit 446 as a single hierarchy storage system, although it is understood that the content delivery system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The content delivery system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the content delivery system 100 is described by operation of the first device 102 and the second device 106. It is understood that the first device 102 and the second device 106 can operate any of the modules and functions of the content delivery system 100. For example, the first device 102 is described to operate the location unit 420, although it is understood that the second device 106 can also operate the location unit 420.

Figure 5:
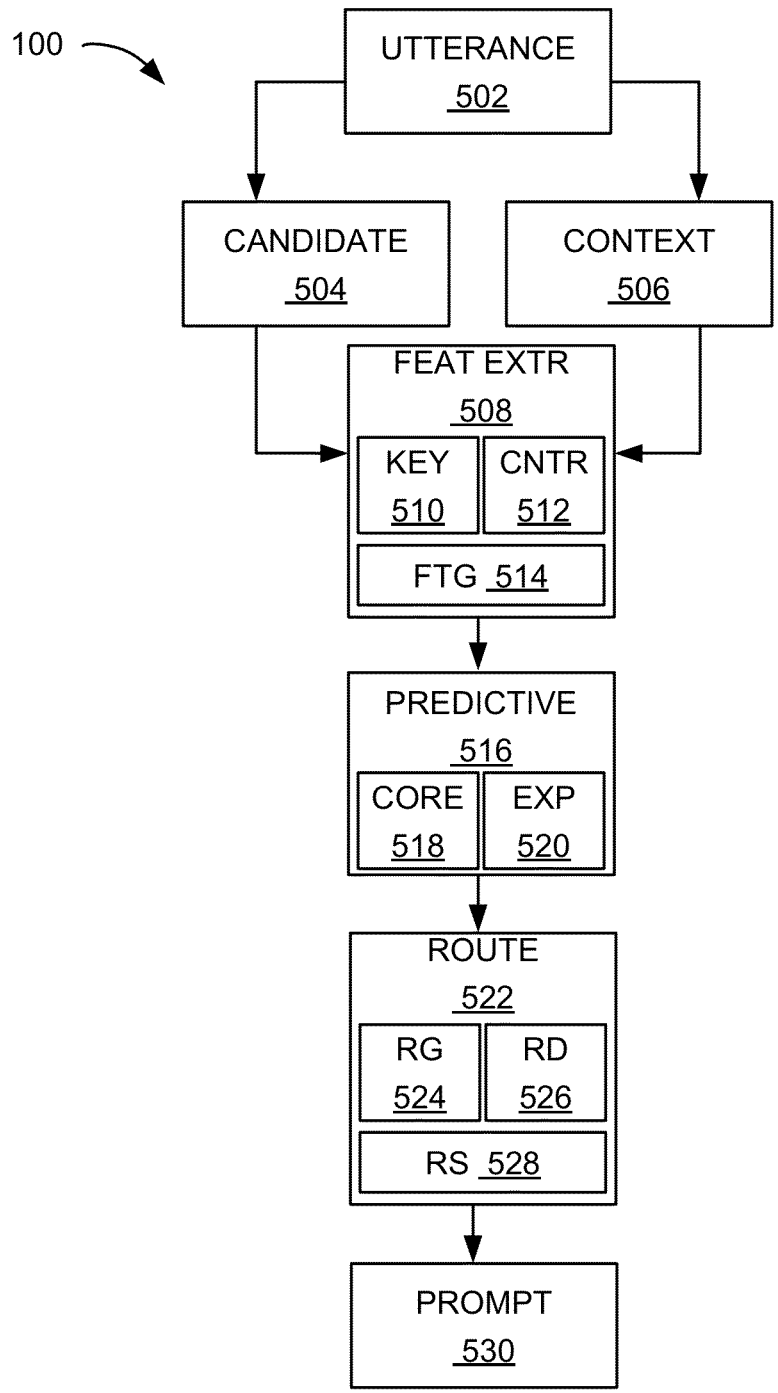
FIG. 5 is a control flow of the content delivery system.

Referring now to FIG. 5, therein is shown a control flow of the content delivery system 100. The content delivery system 100 can include an utterance module 502. The utterance module 502 receives the command input 264 of FIG. 2. For example, the utterance module 502 can receive the command input 264 representing a voice entry from the user of the first device 102 of FIG. 1 requesting navigation information. The utterance module 502 can send the command input 264 to a candidate module 504, a context module 506, or a combination thereof.

The content delivery system 100 can include the candidate module 504. The candidate module 504 receives the candidate route 202 of FIG. 2. For example, the candidate module 504 can receive the candidate route 202 having the route information 212 of FIG. 2.

The candidate module 504 can receive the candidate route 202 in a number of ways. For example, the candidate module 504 can receive the candidate route 202 having the route information 212 from the external source via the first control interface 422 of FIG. 4. The external source can include government database, open source map database, social networking site, or a combination thereof. The candidate module 504 can also receive the candidate route 202 having the route information 212 from the internal source such as the first storage unit 414 of FIG. 4. The first storage unit 414 can store the navigation routing entries for the candidate route 202 from the users of the content delivery system 100. The candidate module 504 can send the candidate route 202 to a feature extraction module 508.

The content delivery system 100 can include the context module 506, which can couple to the utterance module 502. The context module 506 determines the context 228 of FIG. 2. For example, the context module 506 can determine the context 228 based on the environmental condition 230 of FIG. 2, the travel history 224 of FIG. 2, or a combination thereof.

The context module 506 can determine the context 228 in a number of ways. For example, the context module 506 can determine the context 228 based on factoring the environmental condition 230. For a specific example, the context module 506 can determine the context 228 for whether the user of the first device 102 is a local or a foreigner by factoring the travel history 224 within the geographic region 208. More specifically, if the travel history 224 indicates that the user travels through the geographic region 208 every day, the context module 506 can determine the context 228 to be familiar area for the user, thus, a local. In contrast, if the travel history 224 indicates that the user had never traveled in the geographic region 208, the context module 506 can determine the context 228 to be unfamiliar area for the user, thus, a foreigner.

For another example, the context module 506 can determine the context 228 based on factoring the start location 204 of FIG. 2, the destination 206 of FIG. 2, the travel time 234 of FIG. 2, the route type 232 of FIG. 2, or a combination thereof. More specifically, the start location 204 can represent user's home. The destination 206 can represent user's work place. The route type 232 can include local roads and freeway. The geographic location can represent Fremont, Calif. (CA). The travel time 234 can represent 8 AM. By analyzing the environmental condition 230 where and when the user is traveling, the context module 506 can determine the context 228 to be that the user of the first device 102 is commuting to work.

For another example, the context module 506 can determine the context 228 based on factoring the environmental condition 230 representing the traffic condition 216 of FIG. 2. More specifically, the context module 506 can determine the traffic condition 216 based on the speed of the vehicle traveling on the candidate route 202. The speed can represent 4 miles per hour. As a result, the context module 506 can determine the context 228 based on the traffic condition 216 to represent that heavy traffic exists on the candidate route 202. The context module 506 can send the context 228 to the feature extraction module 508.

The content delivery system 100 can include the feature extraction module 508, which can couple to the candidate module 504, the context module 506, or a combination thereof. The feature extraction module 508 identifies the feature 236 of FIG. 2 from the candidate route 202.

The feature extraction module 508 can identify the feature 236 from the candidate route 202 in a number of ways. The feature extraction module 508 can include a key module 510. The key module 510 identifies the key feature 240 of FIG. 2. The key module 510 can identify the key feature 240 in a number of ways. For example, the key module 510 can identify the key feature 240 by calculating the physical distance of the road segment 226 of FIG. 2 in the candidate route 202. More specifically, the key module 510 can determine the key feature 240 based on identifying the road segment 226 having the longest physical distance in comparison to other instances of road segment 226 within the same instance of the candidate route 202.

For another example, the key module 510 can identify the key feature 240 by calculating the traversal duration 244 of FIG. 2 required for traveling the road segment 226 based on the speed limit and the physical distance of the road segment 226. More specifically, the key module 510 can determine the key feature 240 based on identifying the road segment 226 having the longest time for the traversal duration 244 in comparison to other instances of road segment 226 within the same instance of the candidate route 202. For a different example, the key module 510 can identify the key feature 240 based on calculating the travel count 246 of FIG. 2 of the road segment 226. More specifically, the key module 510 can determine the key feature 240 based on calculating the travel count 246 for the road segment 226.

The feature extraction module 508 can include a contrastive module 512. The contrastive module 512 identifies the contrastive feature 242 of FIG. 2. For example, the contrastive module 512 can identify the contrastive feature 242 of the candidate route 202. The contrastive module 512 can identify the contrastive feature 242 in a number of ways. For example, the contrastive module 512 can determine the contrastive feature 242 based on identifying an instance of the road segment 226 existing in one instance of the candidate route 202 but not in other instances of the candidate route 202. More specifically, the road segment 226 can represent a bridge. By comparing the plurality of the candidate route 202, the contrastive module 512 can identify that the road segment 226 representing a bridge existing in one instance of the candidate route 202. Thus, the bridge can represent a unique characteristic for the one instance of the candidate route 202. The contrastive module 512 can identify the contrastive feature 242 by determining the unique characteristic as the contrastive feature 242.

For another example, the contrastive module 512 can identify the contrastive feature 242 by identifying the candidate route 202 traveling through the geographic region 208 not traveled by other instances of the candidate route 202. The contrastive module 512 can identify the contrastive feature 242 to be the geographic region 208 only travelable by one instance of the candidate route 202 and not travelable by another instance of the candidate route 202.

For another example, the contrastive module 512 can identify the contrastive feature 242 based on the directional label 248 of FIG. 2 unique to the candidate route 202. More specifically, one instance of the candidate route 202 can traverse through the geographic region 208 at the southernmost area of the geographic region 208. The other instances of the candidate route 202 can traverse through more northern area of the geographic region 208. The contrastive module 512 can identify the contrastive feature 242 by determining the directional label 248 that is unique for the candidate route 202 relative to other instances of the candidate route 202.

The feature extraction module 508 can include a feature generator module 514. The feature generator module 514 generates the feature 236. For example, the feature generator module 514 can generate the feature 236 based on the context 228, the environmental condition 230, or a combination thereof. More specifically, the feature generator module 514 can generate the feature type 238 of FIG. 2 of the key feature 240 based on the context 228, the environmental condition 230, or a combination thereof. For example, the feature generator module 514 can generate the key feature 240 based on the traffic condition 216 of the candidate route 202. The traffic condition 216 can represent the traffic congestion on the road segment 226. The frequency of the traffic congestion can be tracked and compared to determine that the traffic congestion at the road segment 226 can be the heaviest amongst other instances of the road segment 226. As a result, the feature extraction module 508 can generate the key feature 240 representing the heaviest traffic congestion based on extrapolating from the historical data of the traffic condition 216 of the road segment 226. The feature extraction module 508 can send the feature 236 to a predictive module 516.

The content delivery system 100 can include the predictive module 516, which can couple to the feature extraction module 508. The predictive module 516 generates the route description 250 of FIG. 2. For example, the predictive module 516 can generate the route description 250 based on the feature 236, the context 228, or a combination thereof for generating the prompt 270 of FIG. 2.

The predictive module 516 can generate the route description 250 in a number of ways. The predictive module 516 can include a core module 518. The core module 518 generates the core description 256 of FIG. 2. For example, the core module 518 can generate the route description 250 with the description type 254 of FIG. 2 of the core description 256. The core module 518 can generate the core description 256 in a number of ways.

For example, the core module 518 can generate the core description 256 by combining a plurality of the feature type 238, such as key feature 240 and the contrastive feature 242, the context 228, or a combination thereof. The candidate route 202 can include the key feature 240 representing "US Highway 101" and the contrastive feature 242 representing "San Mateo-Hayward Bridge" for traveling from Berkeley to Redwood City. The context 228 can represent the user is traveling from Berkeley to Redwood City based on the start location 204 of the travel and the destination 206 entered by the user. As a result, the core module 518 can generate the core description 256 for the candidate route 202 from Berkeley to Redwood City to include "US Highway 101" and "San Mateo-Hayward Bridge."

For another example, the core module 518 can generate the core description 256 based on the expression format 260 of FIG. 2. More specifically, the core module 518 can determine the expression format 260 based on identifying the grammatical rule frequently used. The frequency of use for particular instance of the grammatical rule can base on calculating the total usage count 262 of FIG. 2 of the grammatical rule. For example, the first storage unit 414 can store the total usage count 262 for "turn onto street A" and "turn to street A." The total usage count 262 can disclose that more users enter the command input 264 representing "turn onto street A" than "turn to street A." As a result, the core module 518 can generate the core description 256 based on the expression format 260 of "onto" based on the preposition frequently used.

For another example, the core module 518 can generate the core description 256 for resolving the double naming 302 of FIG. 3 based on the context 228. In some instance, the road segment 226 can have two instances of the road name 214. For example, the road segment 226 can have the road name 214 of "US Highway 101" and the road name 214 of "CA State Route 152." The double naming 302 can result from the road segment 226 being shared by both the candidate route 202 representing "US Highway 101" and the candidate route 202 representing "CA State Route 152." The core module 518 can generate the core description 256 by selecting the route information 212 based on the user's travel direction 304 of FIG. 3.

For example, the context 228 of the user's travel direction 304 can represent the user traveling from San Francisco, Calif. to Salinas Calif. on US Highway 101. Based on the context 228, the core module 518 can select the naming of the road segment 226 shared to be "US Highway 101." In contrast, if the context 228 of the user's travel direction 304 can represent the user traveling from Los Banos, Calif. to Gilroy, Calif. on CA State Route 152, the core module 518 can select the naming of the road segment 226 shared to be "CA State Route 152."

It has been discovered that the content delivery system 100 can generate the route description 250 appropriate for the context 228. By tailoring the route description 250 based on the context 228 of where the user is situated and the user's travel direction 304, the content delivery system 100 can improve the accuracy of generating the route description 250 appropriate for the user's interest. As a result, the content delivery system 100 can improve the safe operation of the content delivery system 100 and vehicle.

The predictive module 516 can include an expansion module 520. The expansion module 520 generates the expansion 258 of FIG. 2. For example, the expansion module 520 can generate the expansion 258 based on the candidate route 202 for providing a variation for the road name 214 of FIG. 2. The predictive module 516 can generate the expansion 258 in a number of ways.

For example, the expansion module 520 can generate the expansion 258 based the total usage count 262, the context 228, the route information 212, or a combination thereof. For example, the expansion 258 can represent the alternative naming for the road name 214 of the candidate route 202. The total usage count 262 of the road name 214 for "San Mateo Bridge" can be greater than "CA Highway 92" for the candidate route 202. The expansion module 520 can generate the expansion 258 for the naming of the candidate route 202 to be "San Mateo Bridge" Based on the total usage count 262.

For another example, the expansion module 520 can generate the expansion 258 based on the context 228, the travel history 224, the social information 222, or a combination thereof. The context 228 can represent user traveling southbound on CA State Route 1. The travel history 224 discloses that the user is a local for the geographic region 208. Further, the social information 222 discloses that the term "Pacific Coast Highway (PCH)" is commonly used as the command input 264 for describing CA State Route 1. The expansion module 520 can generate the expansion 258 for naming of the candidate route 202 to be "PCH." In contrast, if the travel history 224 indicates that the user is not a local but a visitor, then the expansion module 520 can generate the core description 256 for naming of the candidate route 202 to be "CA State Route 1." The predictive module 516 can send the route description 250 to a route module 522.

It has been discovered that the content delivery system 100 can generate the route description 250 tailored to the vernacular of the geographic region 208. By customizing the route description 250 with the expansion 258 based on the vernacular of the geographic region 208, the content delivery system 100 can improve the accuracy of generating the route description 250 more relevant to the user living in the geographic region 208. As a result, the content delivery system 100 can improve the safe operation of the content delivery system 100 and vehicle.

It has also been discovered that the content delivery system 100 can generate the route description 250 tailored to the travel history 224 of the user. By customizing the route description 250 based on the travel history 224, the content delivery system 100 can improve the safety of the user traveling through the geographic region 208 by providing accurate navigation information tailored to the user's needs.

The content delivery system 100 can include the route module 522, which can couple to the predictive module 516. The route module 522 generates, selects, or a combination thereof the travel route 252 of FIG. 2. For example, the route module 522 can generate the travel route 252 based on interpreting the command input 264. The route module 522 can generate, select, or a combination thereof of the travel route 252 in a number of ways.

The route module 522 can include a route generator module 524. The route generator module 524 generates the travel route 252. For example, the route generator module 524 can generate the travel route 252 based on interpreting the command input 264. More specifically, the route generator module 524 can interpret the command input 264 by parsing the geographic information and the feature 236 from the command input 264. For example, the command input 264 can represent "From Berkeley, take the San Mateo Bridge to US-101 to Redwood City." The route generator module 524 can parse the start location 204 to represent "Berkeley" and the destination 206 to represent "Redwood City." Further, the route generator module 524 can parse the key feature 240 as "US-101" and the contrastive feature 242 as "San Mateo Bridge" based on comparing the words in the command input 264 to the feature 236 determined in the candidate route 202. As a result, the route generator module 524 can generate the travel route 252 with the start location 204, the destination 206, and feature 236 for traveling from Berkeley to Redwood City.

For another example, the route module 522 can select the travel route 252 from a plurality of the candidate route 202. For example, the route module 522 can designate the plurality of the candidate route 202 as the primary route 266 of FIG. 2 and the non-primary route 272 of FIG. 2 to present the route option 268 of FIG. 2 for selecting the travel route 252.

The route module 522 can include a route designator module 526. The route designator module 526 designates the candidate route 202. For example, the route designator module 526 can designate the plurality of the candidate route 202 as the primary route 266 and the non-primary route 272 to present the route option 268 for selecting the travel route 252. The route module 522 can designate the candidate route 202 in a number of ways.

For example, the route designator module 526 can designate the candidate route 202 based on the context 228, the travel history 224, or a combination thereof. The route designator module 526 can designate the candidate route 202 to represent the primary route 266 if the travel history 224 indicates that the user traveled the candidate route 202 most frequently compared to other instances of the candidate route 202. For a different example, the route designator module 526 can designate the candidate route 202 to represent the primary route 266 if the context 228 indicates that the candidate route 202 has the least traffic congestion compared to other instances of the candidate route 202. For another example, the route designator module 526 can designate the candidate route 202 to represent the primary route 266 if the candidate route 202 is the path currently traversed by the user with the first device 102.

The route module 522 can include a route selector module 528, which can couple to the route designator module 526. The route selector module 528 selects the travel route 252. For example, the route selector module 528 can select the travel route 252 from a plurality of the candidate route 202. The route module 522 can select the travel route 252 in a number of ways.

For example, the route designator module 526 can select the travel route 252 based on selecting the candidate route 202 designated as the primary route 266. For a different example, the route designator module 526 can select the travel route 252 based on interpreting the command input 264. The command input 264 can represent "Take Dumbarton Bridge." "Dumbarton Bridge" can represent the contrastive feature 242. The route designator module 526 can select the candidate route 202 with the contrastive feature 242 of the "Dumbarton Bridge" as the travel route 252 over the candidate route 202 without the contrastive feature 242.

For another example, the route designator module 526 can select the travel route 252 based on comparing the feature 236 amongst the plurality of the candidate route 202. More specifically, the route designator module 526 can select the travel route 252 based on comparing the key feature 240 shared amongst the plurality of the candidate route 202. The command input 264 can represent "Take 580 to Dumbarton Bridge" for traveling from Berkeley, Calif. to Palo Alto, Calif. Two instances of the candidate route 202 can both have the key feature 240 of "Interstate Highway 580." However, one instance of the candidate route 202 can have a longer distance for Interstate Highway 580 than the other instance of the candidate route 202. Since the user preferred taking Interstate Highway 580 as stated in the command input 264, the route designator module 526 can select the candidate route 202 with the longer distance of Interstate Highway 580 as the travel route 252.

For further example, the plurality of the candidate route 202 can share the key feature 240. However, one instance of the candidate route 202 can include the contrastive feature 242. The route designator module 526 can select the candidate route 202 with the contrastive feature 242 as the travel route 252. The route module 522 can send the travel route 252 to a prompt module 530.

The content delivery system 100 can include the prompt module 530, which can couple to the route module 522. The prompt module 530 generates the prompt 270 for notifying the user of the first device 102. For example, the prompt module 530 can generate the prompt 270 based on the route description 250 for describing the travel route 252, the candidate route 202, the road segment 226, or a combination thereof.

The prompt module 530 can generate the prompt 270 in a number of ways. For example, the prompt module 530 can generate the prompt 270 based on the feature 236 in the core description 256. More specifically, if the core description 256 includes the key feature 240, the contrastive feature 242, or a combination thereof, the prompt module 530 can generate the prompt 270 representing the summary highlighting the key feature 240, the contrastive feature 242, or a combination thereof.

For a specific example, the travel route 252 can represent Berkeley to Redwood City via San Francisco. The contrastive feature 242 can represent "Bay Bridge." The prompt module 530 can generate the summary having the contrastive feature 242 as "Take the Bay Bridge to US Highway 101 South." In contrast, the travel route 252 can represent Berkeley to Redwood City but avoids San Francisco. The contrastive feature 242 can represent "Dumbarton Bridge." The prompt module 530 can generate the summary with the contrastive feature 242 as "Take Interstate Highway 580 to the Dumbarton Bridge."

The prompt module 530 can generate the prompt 270 based on the core description 256, the expansion 258, the context 228, or a combination thereof. More specifically, the prompt module 530 can generate the prompt 270 based on the context 228 for adding or removing the feature 236 from the route description 250. For example, the context 228 can represent the user of the first device 102 is a first time visitor in the geographic region 208. The route module 522 can generate the prompt 270 based on the core description 256 rather than the expansion 258 to avoid using common vernacular familiar to the locals of the geographic region 208.

In contrast, the context 228 can represent that the user is a local in the geographic region 208. The core description 256 can represent "Saratoga Sunnyvale Road." The expansion 258 and the residents of Sunnyvale, Calif. can call the same street "Sunnyvale Saratoga Road." The user is a resident of Sunnyvale. According to the social information 222, residents of Saratoga call the street "Saratoga Sunnyvale Road" while the residents of Sunnyvale call the street "Sunnyvale Saratoga Road. The route module 522 can generate the prompt 270 based on the expansion 258 and the context 228 for the user living in Sunnyvale to state "Sunnyvale Saratoga Road" for the prompt 270.

It has been discovered that the content delivery system 100 can generate the prompt 270 appropriate for the context 228.

By tailoring the route description 250 based on the expansion 258 and the context 228 of where the user is situated, the content delivery system 100 can improve the accuracy of generating the prompt 270 more relevant to the user. As a result, the content delivery system 100 can improve the safe operation of the content delivery system 100 and vehicle.

The physical transformation from traveling along the travel route 252 from one instance of the context 228 to another instance of the context 228 results in the movement in the physical world, such as people using the first device 102, the vehicle, or a combination thereof, based on the operation of the content delivery system 100. As the movement in the physical world occurs, the movement itself creates additional information that is converted back into the route information 212 for generating the route description 250 and the prompt 270 for the continued operation of the content delivery system 100 and to continue the movement in the physical world.

The first software 426 of FIG. 4 of the first device 102 of FIG. 4 can include the modules for the content delivery system 100. For example, the first software 426 can include the utterance module 502, the candidate module 504, the context module 506, the feature extraction module 508, the predictive module 516, the route module 522, and the prompt module 530.

The first control unit 412 of FIG. 4 can execute the first software 426 for the utterance module 502 to receive the command input 264. The first control unit 412 can execute the first software 426 for the candidate module 504 to receive the candidate route 202. The first control unit 412 can execute the first software 426 for the context module 506 to determine the context 228.

The first control unit 412 can execute the first software 426 for the feature extraction module 508 to identify the feature 236. The first control unit 412 can execute the first software 426 for the predictive module 516 to generate the route description 250. The first control unit 412 can execute the first software 426 for the route module 522 to generate the travel route 252. The first control unit 412 can execute the first software 426 for the prompt module 530 to generate the prompt 270.

The second software 442 of FIG. 4 of the second device 106 of FIG. 4 can include the modules for the content delivery system 100. For example, the second software 442 can include the utterance module 502, the candidate module 504, the context module 506, the feature extraction module 508, the predictive module 516, the route module 522, and the prompt module 530.

The second control unit 434 of FIG. 4 can execute the second software 442 for the utterance module 502 to receive the command input 264. The second control unit 434 can execute the second software 442 for the candidate module 504 to receive the candidate route 202. The second control unit 434 can execute the second software 442 for the context module 506 to determine the context 228.

The second control unit 434 can execute the second software 442 for the feature extraction module 508 to identify the feature 236. The second control unit 434 can execute the second software 442 for the predictive module 516 to generate the route description 250. The second control unit 434 can execute the second software 442 for the route module 522 to generate the travel route 252. The second control unit 434 can execute the second software 442 for the prompt module 530 to generate the prompt 270.

The modules of the content delivery system 100 can be partitioned between the first software 426 and the second software 442. The second software 442 can include the candidate module 504, the context module 506, the feature extraction module 508, the predictive module 516, and the route module 522. The second control unit 434 can execute modules partitioned on the second software 442 as previously described.

The first software 426 can include the utterance module 502 and the prompt module 530. Based on the size of the first storage unit 414 of FIG. 4, the first software 426 can include additional modules of the content delivery system 100. The first control unit 412 can execute the modules partitioned on the first software 426 as previously described.

The first control unit 412 can operate the first communication unit 416 of FIG. 4 to send the command input 264 to the second device 106. The first control unit 412 can operate the first software 426 to operate the location unit 420 of FIG. 4. The second communication unit 436 of FIG. 4 can send the travel route 252 to the first device 102 through the communication path 104 of FIG. 4.

The content delivery system 100 describes the module functions or order as an example. The modules can be partitioned differently. For example, the candidate module 504 and the context module 506 can be combined. Each of the modules can operate individually and independently of the other modules.

Furthermore, data generated in one module can be used by another module without being directly coupled to each other. For example, the route module 522 can receive the candidate route 202 from the candidate module 504.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

Figure 6:
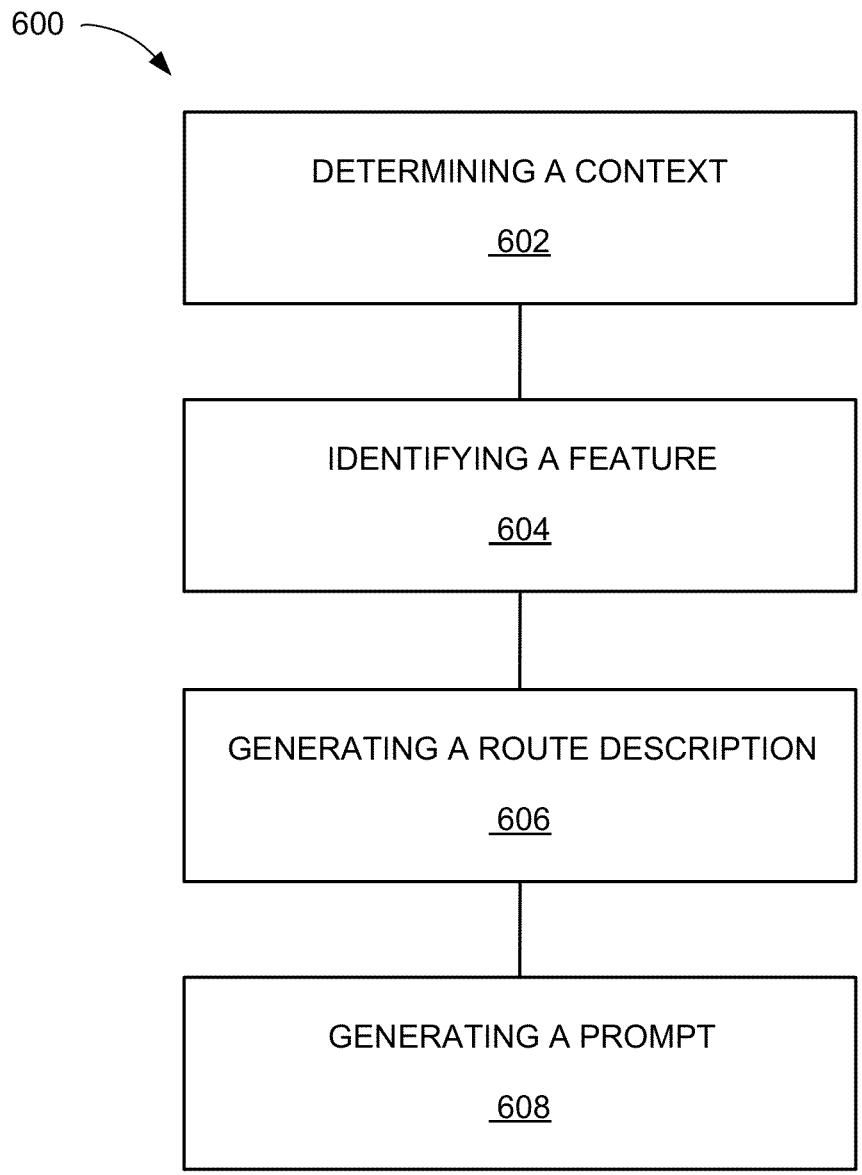
FIG. 6 is a flow chart of a method of operation of the content delivery system in a further embodiment of the present invention.

Referring now to FIG. 6, therein is shown a flow chart of a method 600 of operation of the content delivery system 100 in a further embodiment of the present invention. The method 600 includes: determining a context for identifying a device within a geographic region in a block 602; identifying a feature of a candidate route in a block 604; generating a route description based on the feature with a control unit in a block 606; and generating a prompt based on the context for adding, removing, or a combination thereof the feature from the route description for delivering on the device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a content delivery system comprising:
   determining a context for identifying a device within a geographic region;
   identifying a feature including a key feature and a contrastive feature of a candidate route;
   generating a route description based on the feature with a control unit; and
   generating a prompt based on the context for adding or removing the feature from the route description for delivering on the device.

2. The method as claimed in claim 1 wherein identifying the feature includes identifying the key feature based on comparing a road segment to another instance of the road segment within the candidate route.

3. The method as claimed in claim 1 wherein identifying the feature includes identifying the contrastive feature based on comparing the candidate route to another instance of the candidate route.

4. The method as claimed in claim 1 wherein generating the route description includes generating a core description based on an expression format with a total usage count greater than another instance of the expression format.

5. The method as claimed in claim 1 wherein generating the route description includes generating an expansion based on the context for customizing the route description for the geographic region.

6. A method of operation of a content delivery system comprising:
   determining a context for identifying a device within a geographic region;
   identifying a feature including a key feature and a contrastive feature of a candidate route;
   generating a route description based on the feature with a control unit;
   generating a travel route based on the candidate route; and
   generating a prompt based on the context for adding or removing the feature from the route description for delivering on the device.

7. The method as claimed in claim 6 wherein generating the route description includes generating a core description based the context for a user's travel direction for resolving a double naming of a road segment.

8. The method as claimed in claim 6 wherein generating the route description includes generating an expansion based on a travel history for customizing the route description based on a travel count for the geographic region.

9. The method as claimed in claim 6 further comprising designating the candidate route as a primary route or a non-primary route based on a travel history on the candidate route.

10. The method as claimed in claim 6 further comprising:
    receiving a command input; and
    wherein:
    generating the travel route includes generating the travel route based on parsing the feature from the command input.

11. The method as claimed in claim 6 wherein generating the route description includes generating an expansion based on social information for customizing the route name for the candidate route.

12. A content delivery system comprising:
    a control unit for:
       determining a context for identifying a device within a geographic region,
       identifying a feature including a key feature and a contrastive feature of a candidate route,
       generating a route description based on the feature,
       generating a prompt based on the context for adding or removing the feature from the route description, and
    a communication unit, coupled to the control unit, for delivering the prompt on the device.

13. The system as claimed in claim 12 wherein the control unit is for identifying the key feature based on comparing a road segment to another instance of the road segment within the candidate route.

14. The system as claimed in claim 12 wherein the control unit is for identifying the contrastive feature based on comparing the candidate route to another instance of the candidate route.

15. The system as claimed in claim 12 wherein the control unit is for generating a core description based on an expression format with a total usage count greater than another instance of the expression format.

16. The system as claimed in claim 12 wherein the control unit is for generating an expansion based on the context for customizing the route description for the geographic region.

17. The system as claimed in claim 12 wherein the control unit is for generating a travel route based on the candidate route.

18. The system as claimed in claim 17 wherein the control unit is for generating a core description based the context for a user's travel direction for resolving a double naming of a road segment.

19. The system as claimed in claim 17 wherein the control unit is for generating an expansion based on a travel history for customizing the route description based on a travel count for the geographic region.

20. The system as claimed in claim 17 wherein the control unit is for designating the candidate route as a primary route or a non-primary route based on a travel history on the candidate route.

21. The system as claimed in claim 17 wherein control unit is for:
    receiving a command input; and
    generating the travel route based on parsing the feature from the command input.

22. The system as claimed in claim 17 wherein the control unit is for generating an expansion based on social information for customizing the route name for the candidate route.

* * * * *